US005619664A

United States Patent [19]
Glew

[11] Patent Number: 5,619,664
[45] Date of Patent: Apr. 8, 1997

[54] PROCESSOR WITH ARCHITECTURE FOR IMPROVED PIPELINING OF ARITHMETIC INSTRUCTIONS BY FORWARDING REDUNDANT INTERMEDIATE DATA FORMS

[75] Inventor: Andrew F. Glew, Hillsboro, Oreg.

[73] Assignee: Intel Corporation, Santa Clara, Calif.

[21] Appl. No.: 402,322

[22] Filed: Mar. 10, 1995

Related U.S. Application Data

[63] Continuation of Ser. No. 176,783, Jan. 4, 1994, abandoned.

[51] Int. Cl.$^6$ ........................................... G06F 9/30
[52] U.S. Cl. .................... 395/394; 364/DIG. 1; 395/562; 395/564
[58] Field of Search ........................... 395/775, 375, 395/800; 364/736, 748, 751, 757

[56] References Cited

U.S. PATENT DOCUMENTS

| | | | |
|---|---|---|---|
| 4,156,922 | 5/1979 | Majerski et al. | 364/757 |
| 4,525,796 | 6/1985 | Omoda et al. | 364/730 |
| 4,849,926 | 7/1989 | Hasegawa | 395/800 |
| 4,873,660 | 10/1989 | Nishiyama et al. | 364/768 |
| 4,916,606 | 4/1990 | Yamaoka et al. | 395/375 |
| 4,939,686 | 7/1990 | Fandrianto | 364/752 |
| 4,953,119 | 8/1990 | Wong et al. | 364/754 |
| 5,258,944 | 11/1993 | Smith | 364/748 |
| 5,270,962 | 12/1993 | Fettweis | 364/766 |

OTHER PUBLICATIONS

Kornerup et al, "An Algorithm for Redundant Binary Bit-Pipelined Rational Arithmetic", IEEE, vol. 39, No. 8, Aug. 1990, pp. 1106–1115.

Dawid et al, "High Speed Bit–Level Piplined Architecture for Redundant CORDIC Implementation", IEEE 1992, pp. 358–372.

John L. Hennessy & David A. Patterson, "Computer Architecture A Quantitative Approach", 1990.

David A. Patterson & John L. Hennessy, "Computer Organization & Design –The Hardware/Software Interface", 1994.

"The Metaflow Architecture", pp. 10–13 and 63–73, by Val Popescu, Merle Schultz, John Spracklen, Gary Gibson, Bruce Lightner, and David Isaman, IEEE Micro, 1991.

"Computer Arithmetic Principles, Architecture, and Design", by Kai Hwang, 1976.

Primary Examiner—Parshotam S. Lall
Assistant Examiner—Viet Vu
Attorney, Agent, or Firm—Blakely, Sokoloff, Taylor & Zafman

[57] ABSTRACT

A processor providing a redundant intermediate form of a result in fewer than the total number of clock cycles needed to calculate a final complete result. The redundant form is forwarded to subsequent instructions or operations capable of utilizing the redundant intermediate form to enhance the performance of the processor.

9 Claims, 5 Drawing Sheets

FIG. 4

| FROM \ TO | | A | L | Z | C | M | S | * | ÷ | J |
|---|---|---|---|---|---|---|---|---|---|---|
| A: | INTER ARITHMETIC E.G., ADD, SUBTRACT, NEGATE | 1 | 2 | 2 | 1 | 1 | 1 | 1 | 1 | X |
| L: | LOGICAL E.G., AND, OR, XOR NOT | 1 | 1 | 1 | 1 | 1 | 1 | 1 | 1 | X |
| Z: | COMPARES E.G., =0, ≠0 <0, ≤0 >0, ≥0 | 1 | 1 | 1 | 1 | 1 | 1 | 1 | 1 | 1 |
| C: | COMPARISON OF TWO ARBITRARY NON-ZERO VALUES | 2 | 2 | 2 | 2 | 2 | 2 | 2 | 2 | 2 |
| M: | MEMORY ADDRESS COMPONENT | X | X | X | X | X | X | X | X | X |
| S: | STORE DATA | X | X | X | X | X | X | X | X | X |
| *: | MULTIPLY | *(1) | *(2) | *(1) | *(1) | *(1) | *(1) | *(1) | *(1) | * |
| ÷: | DIVIDE | *(1) | *(2) | *(1) | *(1) | *(1) | *(1) | *(1) | *(1) | * |
| J: | JUMP | X | X | X | X | X | X | X | X | X |

PROCESSOR WITH ARCHITECTURE FOR IMPROVED PIPELINING OF ARITHMETIC INSTRUCTIONS BY FORWARDING REDUNDANT INTERMEDIATE DATA FORMS

This is a continuation of application Ser. No. 08/176,783, filed Jan. 4, 1994, now abandoned.

FIELD OF THE INVENTION

The present invention relates generally to the field of computers and computer arithmetic; particularly to the architecture and design of arithmetic logic units, and to the control of pipelined computers.

BACKGROUND OF THE INVENTION

Pipelining is a well-understood implementation technique whereby multiple instructions are overlapped in execution to increase the processing speed of a throughput-oriented computer system. Pipelines within a computer resemble an assembly line in that each portion of the pipeline (commonly referred to as "pipestages") completes a portion of the instruction's execution. Instructions enter one end of the pipeline and exit the other end—with the time required for moving an instruction one pipestage down the assembly line being known as a machine cycle.

Some modern computer systems employ what is known as "superpipelining". Superpipelined machines have higher clock rates and deeper pipelines and are characterized by pipelining of most functional units. Superpipelining refers to taking a function that is currently performed in, say, one pipestage, and spreading it over two or more pipestages. In general, the purpose of increasing the number of pipestages in a superpipelined machine is to produce a shorter clock cycle.

Today, processors are commercially available which superpipeline memory operation units such as cache memories. Superpipelining of actual arithmetic units, however, has yet to be successfully achieved. While academicians have proposed designs for superpipelining arithmetic units, these proposals suffer from serious drawbacks.

For example, many proposed superpipelined arithmetic units for computer systems suffer poor performance because the result of an arithmetic operation is often used immediately when it is ready or available. Very often there is a need to use the results of a computation soon afterwards, e.g., one instruction later. If it takes two machine cycles to perform a computation on a simple machine, a pipeline STALL cycle (also frequently referred to as a "pipeline bubble") must be inserted into the pipeline flow to allow a needed result to propagate through an arithmetic unit. The basic problem therefore is that while pipelining is a valuable concept in a purely throughput-oriented computer system—where the assumption is that computation results are not needed until much, much later—in arithmetic logic units the performance advantage of pipelining or superpipelining techniques is drastically reduced because many computations are latency sensitive.

As will be seen, the present invention makes it possible to improve the performance of a pipelined or superpipelined machine by taking advantage of the redundant intermediate form of a result, even though the full result has not yet completed execution. The redundant form of a result refers to a numerical representation where the particular value being represented has more than one bit pattern encoding.

Computer arithmetic and number systems are described generally in the book entitled "Computer Arithmetic Principles, Architecture and Design," by Kih Wang, John Wiley and Sons, 1979, pages 1–12. Redundant representations of numbers are also described generally in pages 97–127 of Mr. Wang's book.

SUMMARY OF THE INVENTION

A general purpose processor providing a redundant intermediate form of a result is disclosed. The processor comprises an arithmetic execution unit that performs simple operations like ADD, SUBtract, compare (CMP), in one or more clock cycles. The arithmetic execution unit of the processor produces redundant form intermediate results in fewer than the total number of clock cycles needed to calculate a final complete result. The redundant form is forwarded or bypassed by logic to subsequent instructions or operations capable of utilizing the available redundant intermediate form. By making the redundant intermediate form available before the final, complete result, subsequent operations or instructions may execute sooner, thereby enhancing the performance of the processor.

Optionally, the invention further includes a mechanism to stall instructions in the pipeline that require non-redundant inputs.

BRIEF DESCRIPTION OF THE DRAWINGS

The present invention will be understood more fully from the detailed description which follows and from the accompanying drawings, which, however, should not be taken to limit the invention to the specific embodiments shown, but rather are provided for explanation and understanding only.

FIG. 4 lists various programming situations where forwarding of redundant intermediate forms may occur in accordance with one embodiment of the present invention.

DETAILED DESCRIPTION

A general purpose processor containing an arithmetic execution unit that utilizes the intermediate redundant form of results is described. In the following description, numerous specific details are set forth, such as particular architectures, circuits, computations, etc., in order to provide a thorough understanding of the present invention. It should be understood, however, that these specific details need not be used to practice the invention. In other instances, well-known structures, circuits, architectures, etc., have not been shown in detail in order to avoid unnecessarily obscuring the present invention.

A redundant form of a number refers to any one of the many possible representations of a number; wherein a particular numerical value may be represented by more than one bit pattern encoding. For example, the "CARRY/SAVE"

form is a commonly used form of redundant representation in the field of computer arithmetic.

Table 1 below provides an example of several numerical values and their representations in CARRY/SAVE form.

TABLE 1

| Carry | Bit | Value |
|-------|-----|-------|
| 0 | 0 | 0 |
| 0 | 1 | 1 |
| 1 | 0 | 1 |
| 1 | 1 | 2 |

As appreciated by practitioners in the art, the CARRY/SAVE form is a convenient redundant form representation in which the numerical representation is divided into N-bit chunks, and the "carry" across the N-bit boundary is saved. Practitioners in the art will further appreciate that there are several other redundant forms for representing numerical values. The present invention works equally well with all types of redundant numerical representations.

The invention takes advantage of redundant forms by utilizing the redundant form of numerical representation to make calculations run faster. Redundant form representations are utilized in accordance with the present invention to provide a pipelined or superpipelined general purpose arithmetic unit. The invention improves the overall performance of a processor by forwarding the redundant arithmetic form of a number prior to the final completion of the result.

Figure 1:
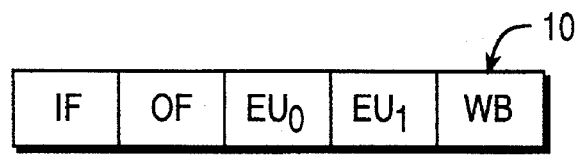
FIG. 1 illustrates a pipeline of a general purpose processor.

Referring now to FIG. 1, there is shown a pipeline 10 of a general purpose microprocessor. For example, the first stage of the pipeline is the instruction fetch (IF) process which involves fetching an instruction from memory, decoding the instruction and placing it into a queue or buffer. The next stage in the pipeline is the operand fetch (OF) process. Here, operands required for the computation are retrieved from a memory location such as a cache or main memory.

The first execution unit pipestage is illustrated in FIG. 1 by the block $EU_0$. For simple logic operations such as AND or OR operations, the first execution unit pipestage produces the complete result. For other arithmetic operations, such as ADD, SUBTRACT, MULTIPLY, etc., the first execution unit pipestage makes available the redundant intermediate form of the result. In the second execution unit pipestage, $EU_1$, the non-redundant form of the arithmetic calculation is completed. Finally, in the writeback (WB) stage, the result is written back to memory.

Now consider the example instruction sequence shown below in conjunction with the illustration of FIG. 2.

INSTR 1: EBX←ADD (EBX, 1)
INSTR 2: ECX←2
INSTR 3: CMP (EBX, EDX)

Figure 2:
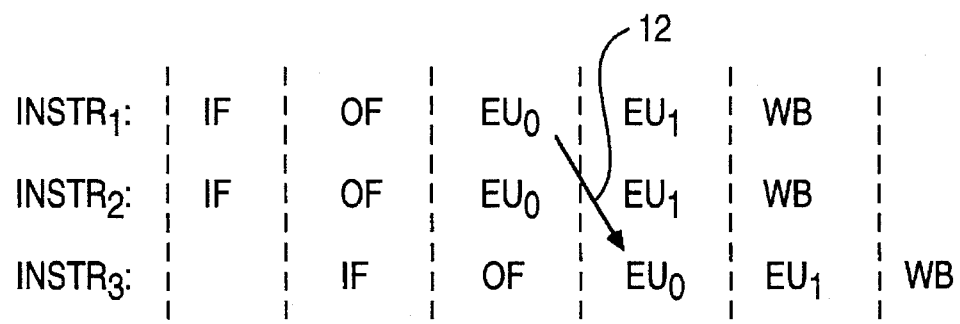
FIG. 2 is an example instruction sequence.

FIG. 2 illustrates the pipelining for the above instruction sequence consisting of an ADD operation, followed by a STORE and a COMPARE logical operation. The first pipestage of FIG. 2 shows the occurrence of the instruction fetch process for instructions $INSTR_1$ and $INSTR_2$. In the next pipestage, operands are fetched, followed by the first execution unit pipestage for both instructions. In the third pipestage, concurrent with the operand fetch process for $INSTR_1$ and $INSTR_2$, the instruction fetch process is carried out for instruction $INSTR_3$. That is, in the third pipestage, operands are fetched for the third instruction while $INSTR_1$ and $INSTR_2$ are executing in the first instruction unit pipestage, $EU_0$, and so on.

Arrow 12 in FIG. 2 indicates the forwarding of the redundant form of the calculated result. For example, since $INSTR_3$ utilizes the results of $INSTR_1$, the redundant form calculation must be completed before the fourth pipestage in the example of FIG. 2.

Certain operations, of course, require, or are simpler to implement, with a non-redundant input. An example of this category of operations are logical operations such as AND/OR, comparisons against zero, etc. By way of illustration, consider the example instruction sequence given below.

INSTR 1: EAX←ADD (EBX, 1)
INSTR 2: ECX←2
INSTR 3: CMP (EBX, EDX)
INSTR 4: ESI←OR (EAX, EBP)

Figure 3:
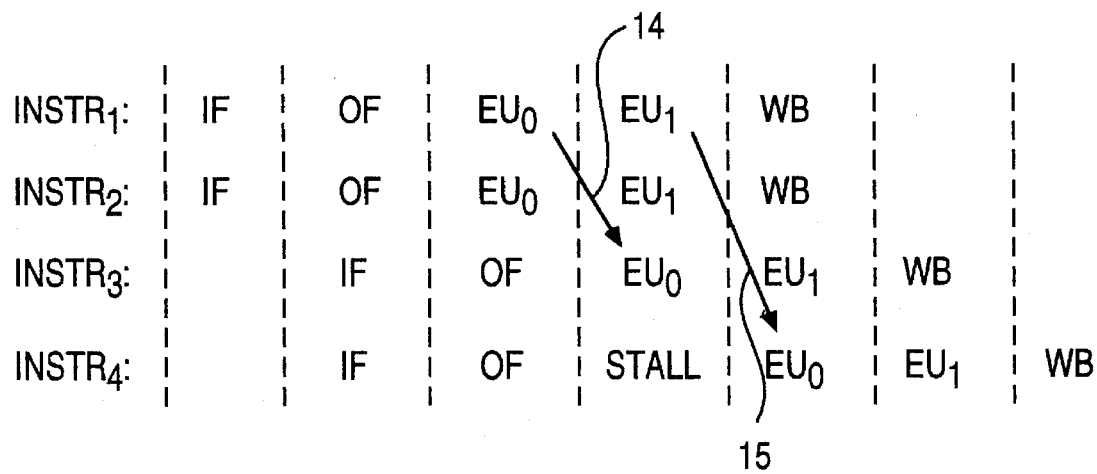
FIG. 3 is another example instruction sequence.

The above listing is the same as the earlier example, except that a fourth instruction, $INSTR_4$, has been added. The execution of this sequence in a pipelined machine is illustrated by FIG. 3. In FIG. 3, the forwarding or bypassing of the redundant form of the intermediate calculation results from $INSTR_1$ is illustrated by arrow 14. The execution results from the $EU_0$ cycle calculated in $INSTR_1$ (pipeline cycle 3) are forwarded to pipestage 4, where the $EU_0$ pipestage is executed as part of $INSTR_3$.

Bypass of the non-redundant form is illustrated in FIG. 3 by arrow 15. In this case, because the non-redundant form of the result is required for the first execution stage ($EU_0$) of $INSTR_4$, a STALL must be inserted in the fourth pipestage for $INSTR_4$ in order to wait for the execution results of $INSTR_1$ to arrive.

It is important to recognize that while many modern processors pipeline units such as a floating point units (because of their throughput-oriented nature), integer computations are rarely pipelined. The reason for this is because many integer computations are latency sensitive.

In accordance with the present invention, certain computations (such as the addition of large numbers; e.g. 64-bits) are split into two different cycles. The operations are then pipelined. While the true final result is only available after completion of the second execution clock cycle, an intermediate result can be used as an input immediately upon completion of the first execution cycle. This means that a redundant form of the result can be used for many next instructions in the program sequence.

In the examples of FIGS. 2 and 3, the redundant intermediate form is available after the first execution cycle for the ADD instruction ($INSTR_1$). Even though the ADD operation will not provide a final result until after the second execution cycle (i.e., $EU_1$), the redundant intermediate form is available for use by instruction $INSTR_3$ in the program flow.

One arithmetic operation where the use of the redundant intermediate form is particularly useful is CARRY/SAVE addition. When the two numbers are added together, the propagate CARRY-bit is typically generated. In prior art circuits, this CARRY-bit must be propagated throughout all of the bit positions before a final result is achieved. The fastest that most CARRY/SAVE circuits can run is logarithmic with the number of bit positions. This means that for the very large numbers (e.g. 64-bits) a considerable time may pass before a final result is available.

An example of this situation is the addition of the two numbers 0001 and 1111. For this addition, a CARRY-bit must be propagated across all bit positions of the result. Instead of propagating a CARRY-bit in the traditional manner, the present invention recognizes that all numerical representations are essential polynomials where each digit represents a coefficient multiplied by some number. This means that the above example can be represented as shown below.

$$\begin{array}{r} 0\ 0\ 0\ 1 \\ +\ 1\ 1\ 1\ 1 \\ \hline 1\ 1\ 1\ 2 \\ (01)\ (01)\ (01)\ (10) \end{array}$$

Here, the true value of 16 is represented as:

$$(2\times2^0)+(1\times2^1)+(1\times2^2)+(1\times2^3)=16$$

In this redundant form, the CARRY is represented by the binary pattern 10. There is no need to propagate the CARRY-bit all the way through to arrive at this intermediate result. The present invention recognizes the usefulness of calculating intermediate results in redundant form to increase the computational speed of a processor. Whereas most systems only utilize non-redundant forms (e.g. binary representations) the present invention performs redundant operations to enhance computer performance.

It is appreciated that the CARRY/SAVE form is only one of many possible non-redundant forms. The same result can be achieved if bits are grouped along certain bit positions. For example, grouping bits two-by-two would produce the result shown below for the previous example.

$$\begin{array}{cc} 0\ 0 & 0\ 1 \\ 1\ 1 & 1\ 1 \\ \hline 0 \rfloor\ 1\ 1 & 1 \rfloor\ 0\ 0 \\ C & C \end{array}$$

In other words, the CARRY can be propagated along one, two, four, . . . , N-bit positions; as many bit positions as is convenient to do in a given cycle of time. Typically, if two 64-bit numbers are to be added, one possible solution might be to propagate the CARRY across the 32-bit boundary in a first cycle, followed by the remaining 32-bits in a second execution cycle.

Thus, the concept of the present invention is to divide up the CARRY in a convenient place in order to improve the processing speed of the arithmetic unit. Returning back to the examples of FIG. 3, since $INSTR_3$ depends on $INSTR_1$, in a traditional arithmetic logic unit the second execution stage $EU_1$ of $INSTR_3$ would have to execute one pipeline stage later than shown. But because the present invention allows the use of redundant intermediate forms, $INSTR_3$ can execute on the very next pipestage following the calculation of the intermediate redundant form. This is shown occurring by arrow 14 in FIG. 3.

FIG. 3 also illustrates that there are a certain number of situations where an operation cannot tolerate a non-redundant input. For example, this situation is illustrated by $INSTR_4$ depending on the result of $INSTR_1$. Because $INSTR_4$ is a logical operation (i.e., OR) which tests for equality, a STALL must be introduced into the fourth pipestage.

FIG. 4 lists the various programming situations where forwarding can be performed using the redundant and non-redundant bypass mechanisms of the present invention for a particular embodiment (e.g., a x86 instruction set architecture). In FIG. 4, bypassing occurs from the operation shown on the left to the operation shown on the right. Note that in FIG. 4, the number "1" is used to denote a situation where the fast forwarding path can be used, typically involving redundant forwarding of intermediate results. The number "2" is used to denote a situation in which the slow (non-redundant) path must be used. An "X" indicates a situation that does not occur in the example microarchitecture described herein. The symbol "*" denotes uninteresting situations that occur with multiplies and divides. These situations are uninteresting because multiplies and divides have such long latencies that saving one clock cycle is insignificant. Nevertheless, the associated latencies are indicated parenthetically in FIG. 4 for most of these "*" situations.

By way of example, in FIG. 4 an ADD can be forwarded to another ADD with no penalty. But an ADD followed by a logical operation requires that the non-redundant path must be used. The reason for this is that you need the values of every bit position to perform a logical operation such as OR, AND, XOR, etc. Note, however, that a comparison of two arbitrary non-zero values occurs less often than a comparison to zero. As shown by FIG. 4, comparisons to zero allow for redundant forwarding of intermediate results to improve performance speed.

It should be understood that the information provided in FIG. 4 is particular to one embodiment, which is to x86-type compatible computer architecture. Thus, it is to be understood that other computer architectures might utilize the present invention in a different manner.

Figure 5:
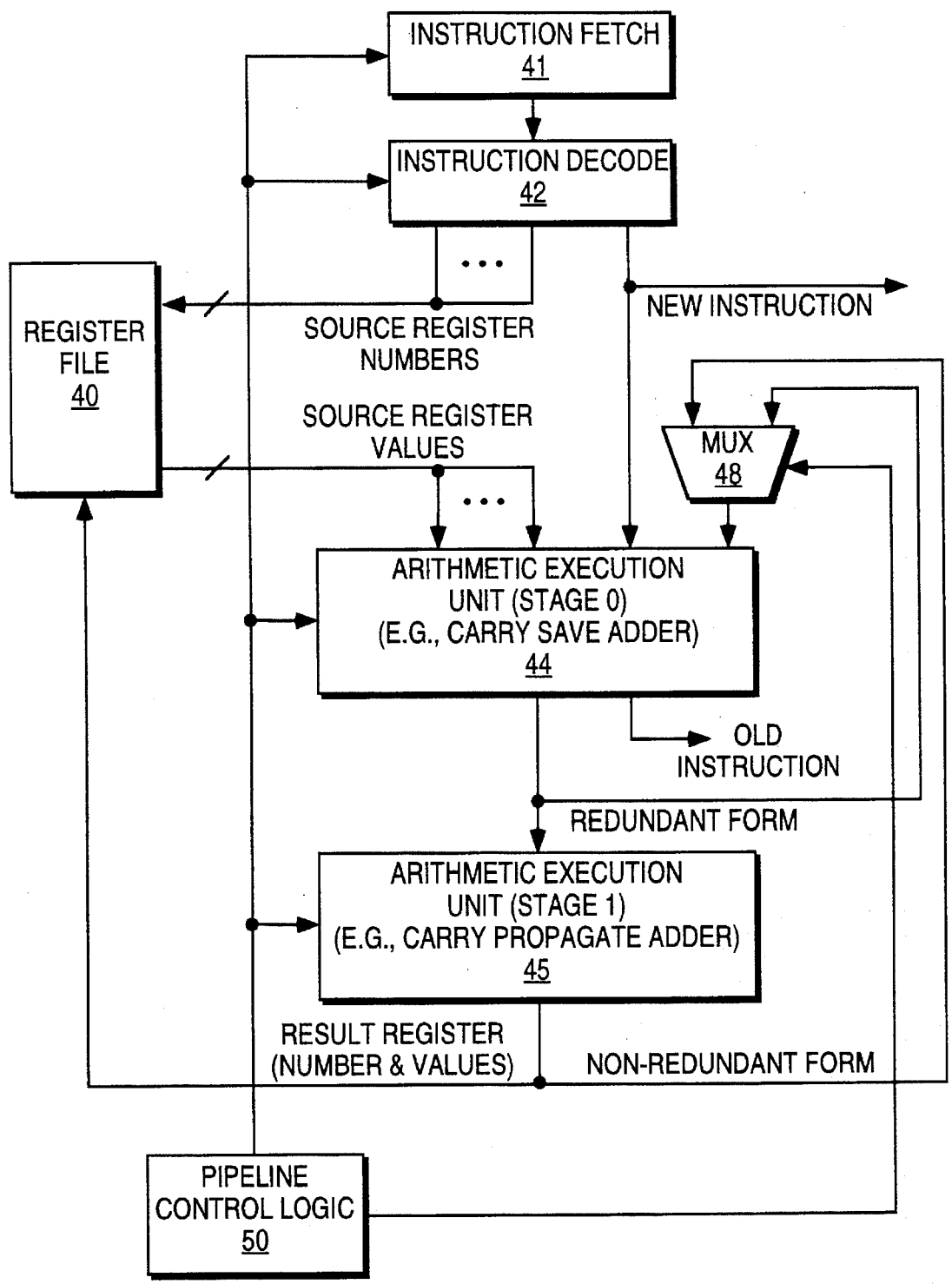
FIG. 5 illustrates one implementation of the present invention.

Referring now to FIG. 5, there is shown one implementation of the present invention including instruction fetch and decode units 41 and 42, respectively, which decode new instructions to be executed. Instruction decode unit 42 provides source register numbers to a register file 40, which, in turn, provides source register values to the stage 0 arithmetic execution unit (AEU) 44. By way of example, AEU 44 may comprise a carry save adder (CSA), which is known to perform one type of redundant operation.

The resulting intermediate redundant form output by AEU 44 is coupled to AEU 45 (stage 1), and also to one input of MUX 48. In the embodiment shown in FIG. 5, stage 1 arithmetic execution unit 45 is implemented by a carry propagate adder (CPA). AEU 45 outputs the non-redundant form of the result, which is then coupled back to one input of MUX 48. The number and values generated by the calculation are also stored in a result register in file 40, were they can be used for future arithmetic operations. Pipeline control logic 50 controls the operation of units 41, 42, 44, 45 and MUX 48. In particular, control logic 50 selects either the redundant or non-redundant form to be used in the stage 0 execution of AEU 44. This allows the use of an intermediate redundant form for the next instruction.

Figure 6:
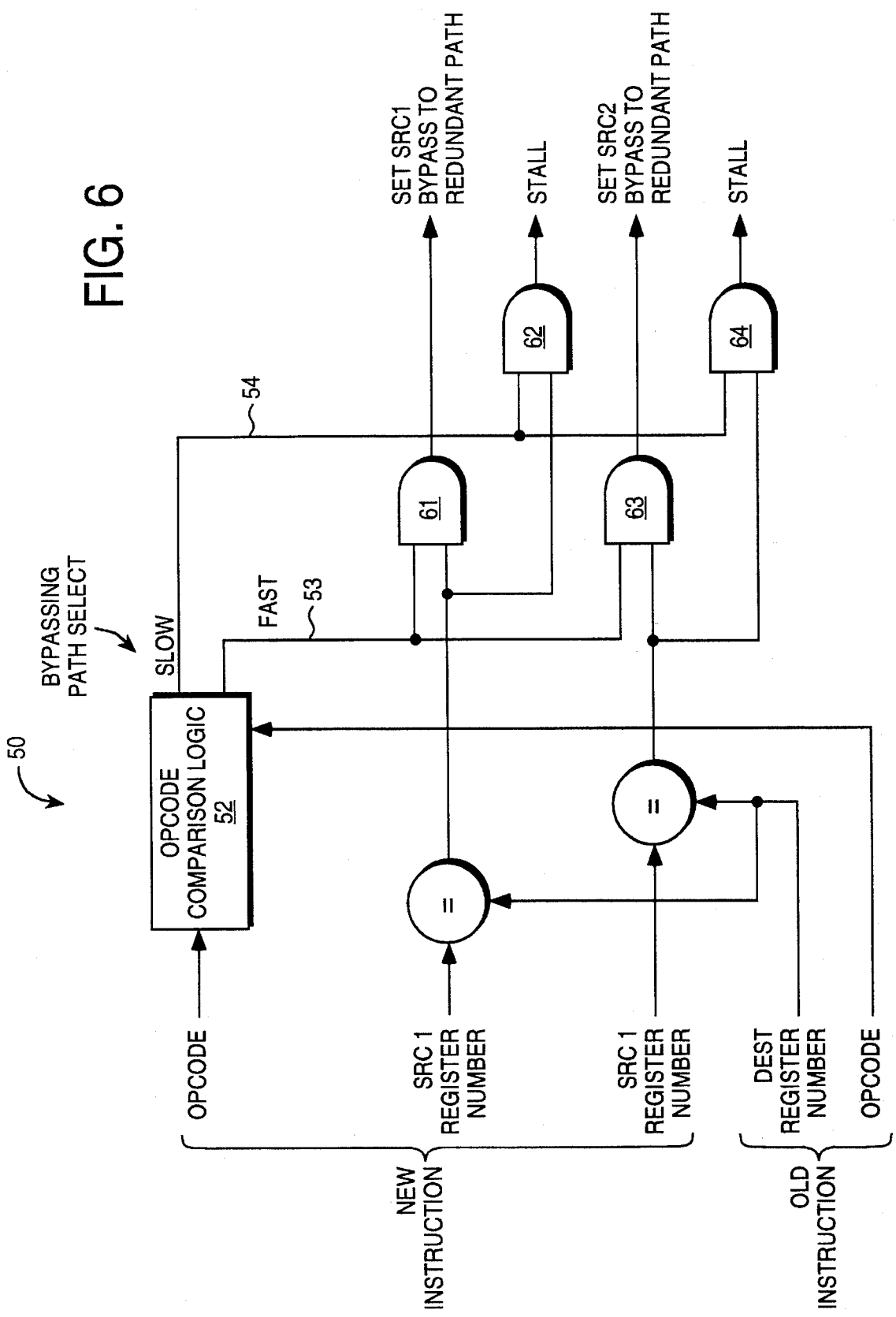
FIG. 6 illustrates one embodiment of the pipeline control logic for FIG. 5.

FIG. 6 illustrates, by way of example, one implementation of pipeline control logic 50. Pipeline control logic 50 includes opcode comparison logic 52 which compares the opcodes of both the old and new instructions in the programming sequence. Comparison logic 52 implements the forwarding path information provided in FIG. 4 based on these opcodes. For example, if two consecutive ADD operations occurred in the program flow, then opcode comparison logic 52 would select the FAST path by driving line 53 logically high and by driving line 54 (i.e., the SLOW path) logically low. The AND logic network comprising gates 61–64 sets the appropriate source bypass path (i.e., redundant or STALL), depending upon the equivalence of the source and destination register numbers of the new and old instructions, respectively. It is appreciated that ordinary pipeline latches may be utilized to temporarily store the redundant intermediate form part-way through the computation cycle.

The result of the structure of FIG. 6 is that an existing adder mechanism can be modified by splitting the ADD at a convenient point and incorporating pipeline latches to hold redundant intermediate results. Splitting the ADD and latching the redundant form of the computation in the pipeline allows implementation an arithmetic unit that dramatically improves processor performance by forwarding of redundant intermediate forms.

Figure 7:
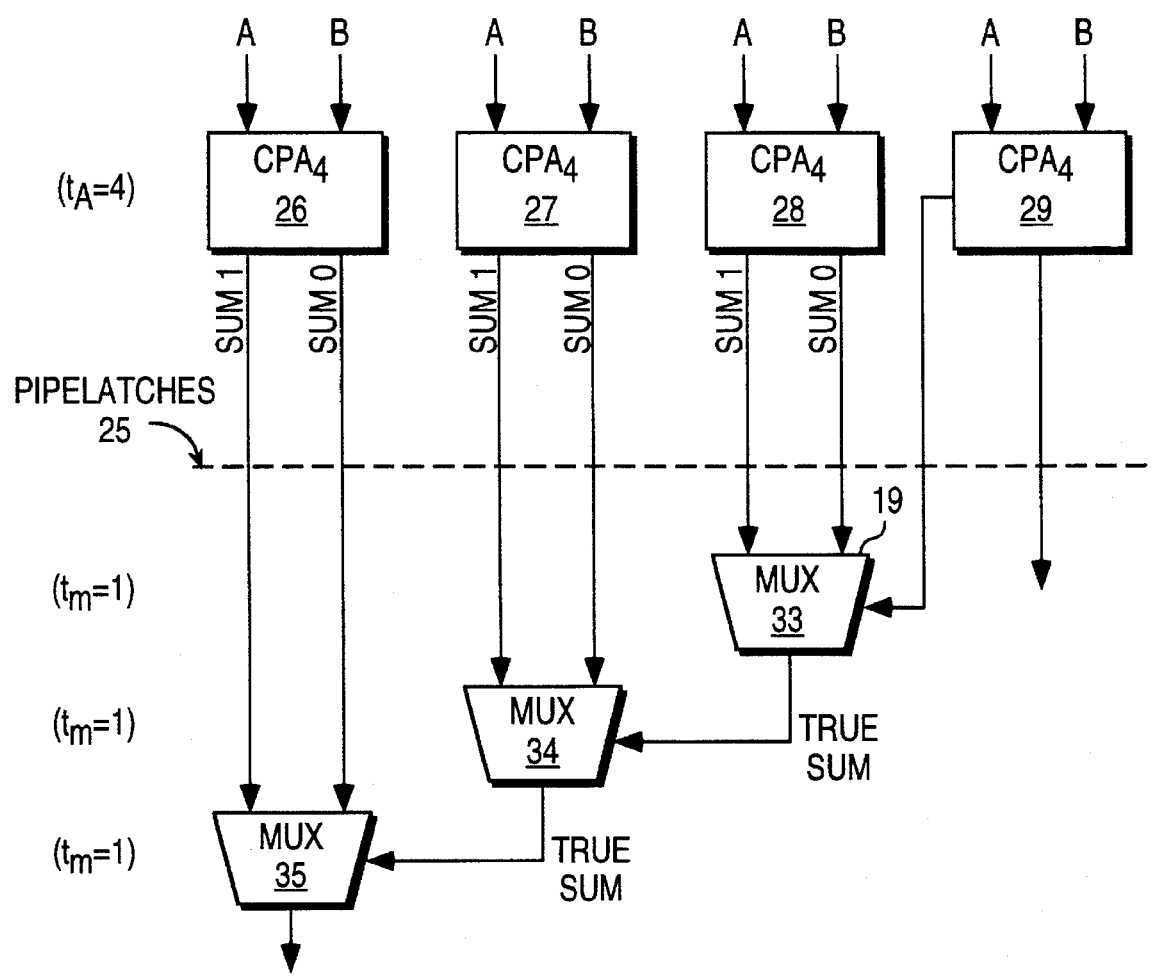
FIG. 7 is an embodiment of an adder architecture which forwards redundant intermediate forms.

FIG. 7 is an embodiment of an adder architecture which forwards redundant intermediate forms. Basically, the architecture of FIG. 7 is a unit that adds each of two bits and is four components deep. When a portion of bits of two numbers are added there is typically a need to know the value of the CARRY bit from the lower grouping of bits. A CARRY/SAVE adder produces two sums: $SUM_1$ (the sum of the CARRY=0) and $SUM_0$ (the sum of the CARRY=0). In the embodiment of FIG. 7, both numbers can be added quickly, but the CARRY input will be available late. This means that the CARRY input of the previous cell can be used as a multiplexer select input between the $SUM_0$ and $SUM_1$ elements. A true sum of all of the numbers is generated several machine cycles later. The individual adders of FIG. 7 are represented by adders 26–29 while the multiplexers are shown as MUXs 33–35. The location of the pipestage latches is represented in FIG. 7 by dashed line 25. The ADD operation of adders 26–28 consumes a time $t_A=4$, followed by three multiplexer delays $t_M=1$.

It is important to understand that pipestage latches 25 may be placed anywhere along the data propagation path. That is, latching could be performed further down the propagation path depending upon how many bits are to be forwarded in a redundant form. The basic idea, however, remains the same: to be able to forward a redundant form of an arithmetic result from one arithmetic operation to a subsequent operation (e.g., ADD to ADD, ADD to Memory Reference, ADD, SUBTRACT, NEGATE to another instruction, etc.).

The crux of the invention, therefore, is to provide a redundant form of the arithmetic operation as an input to a subsequent operation—where the redundant form is forwarded part-way through the execution cycle. Depending upon the number of bits that are to be forwarded, the clock period can be divided into 2, 3, 4, or N divisions (where N is a positive integer greater than one). The salient feature is that the present invention allows the forwarding of the redundant intermediate form of a result in cases that are dynamically most important, e.g., ADDs to Memory References.

I claim:

1. A processor comprising:

a decoder that decodes a first and a second instruction;

a register file coupled to the decoder that stores source operand values specified by the first and second instructions;

an arithmetic execution unit, coupled to the decoder, having an operand bypass network that receives the source operand values from the register file;

pipeline control logic, coupled to the decoder and the operand bypass network, that causes the operand bypass network to forward a redundant intermediate result generated during a first execution stage of the first instruction when the first instruction involves inter arithmetic and the second instruction involves inter arithmetic, comparison of two non-zero values, memory addressing, data storage, multiplication or division and that causes the operand bypass network to forward a non-redundant result generated during a second execution stage of the first instruction when the second instruction involves logic and zero comparison.

2. The processor of claim 1, wherein the arithmetic execution unit comprises a plurality of carry save adder units.

3. The processor of claim 1, wherein the pipeline control logic comprises a comparison logic unit for comparing opcodes of the first and the second instructions.

4. A processor comprising:

a decoder that decodes a first and a second instruction;

a register file coupled to the decoder that stores source operand values specified by the first and second instructions;

an arithmetic execution unit, coupled to the decoder, having an operand bypass network that receives the source operand values from the register file;

pipeline control logic, coupled to the decoder and the operand bypass network, that causes the operand bypass network to forward a redundant intermediate result generated during a first execution stage of the first instruction when first instruction involves logic and the second instruction involves inter arithmetic, logic, zero comparison, comparison of two non-zero values, memory addressing, data storage, multiplication or division.

5. The processor of claim 4, wherein the arithmetic execution unit comprises a plurality of carry save adder units.

6. The processor of claim 4, wherein the pipeline control logic comprises a comparison logic unit for comparing opcodes of the first and the second instructions.

7. A processor comprising:

a decoder that decodes a first and a second instruction;

a register file coupled to the decoder that stores source operand values specified by the first and second instructions;

an arithmetic execution unit, coupled to the decoder, having an operand bypass network that receives the source operand values from the register file;

pipeline control logic, coupled to the decoder and the operand bypass network, that causes the operand bypass network to forward a redundant intermediate result generated during a first execution stage of the first instruction when first instruction involves AND, OR, XOR, and NOT operations and the second instruction involves inter arithmetic, logic, zero comparison, comparison of two non-zero values, memory addressing, data storage, multiplication or division.

8. The processor of claim 7, wherein the arithmetic execution unit comprises a plurality of carry save adder units.

9. The processor of claim 7, wherein the pipeline control logic comprises a comparison logic unit for comparing opcodes of the first and the second instructions.

* * * * *